United States Patent [19]

Vassie et al.

[11] 4,250,746

[45] Feb. 17, 1981

[54] AIRCRAFT INSTRUMENT

[75] Inventors: Craig D. Vassie; Alexander B. Fisher, both of London, England

[73] Assignee: British Airways Board, London, England

[21] Appl. No.: 56,126

[22] Filed: Jul. 9, 1979

[30] Foreign Application Priority Data

Jul. 13, 1978 [GB] United Kingdom ............... 29767/78

[51] Int. Cl.$^3$ .......................................... G01C 21/10
[52] U.S. Cl. ..................................... 73/178 T; 73/179
[58] Field of Search ................ 73/179, 178 T, 178 R, 73/180; 116/DIG. 43

[56] References Cited

U.S. PATENT DOCUMENTS

| | | | |
|---|---|---|---|
| 3,496,769 | 2/1970 | Vietor | 73/178 T |
| 3,789,661 | 2/1974 | Melsheimer | 73/179 |
| 4,021,010 | 5/1977 | Bliss | 73/178 T |
| 4,127,249 | 11/1978 | Lambregts | 73/178 R |

Primary Examiner—Donald O. Woodiel
Attorney, Agent, or Firm—Larson, Taylor and Hinds

[57] ABSTRACT

A combined vertical speed and windshear indicator instrument for an aircraft has a graduated dial (2) and a conventionally driven pointer (3) for indicating the vertical speed. In addition the instrument has an independent pointer (4) which is driven so that it indicates, to the same scale as the vertical speed, the rate of change of total energy of the aircraft (energy rate) according to the formula $dh/dt + (V/g)(dV/dt)$ where h is the height of the aircraft and V is its true air speed. Under stable flight conditions the pointers (3 and 4) will track together, but if there are any sudden changes, particularly changes due to windshear, the pointers will separate to indicate the effect of the changes so that the necessary corrective action can be taken by the pilot. The energy rate pointer (4) is driven by a signal (22) derived from input signals (5 and 6) which respectively represent the vertical speed h and the true air speed V of the aircraft and which are delayed by the use of filters (10, 14 and 20) for reducing noise interference. The response time of the energy rate pointer (4) to sudden acceleration of the aircraft itself is therefore improved by deriving the (dV/dt) term of the energy rate drive signal (22), for a short period following the sudden acceleration, from a signal (24) representative of the longitudinal acceleration x of the aircraft.

11 Claims, 3 Drawing Figures

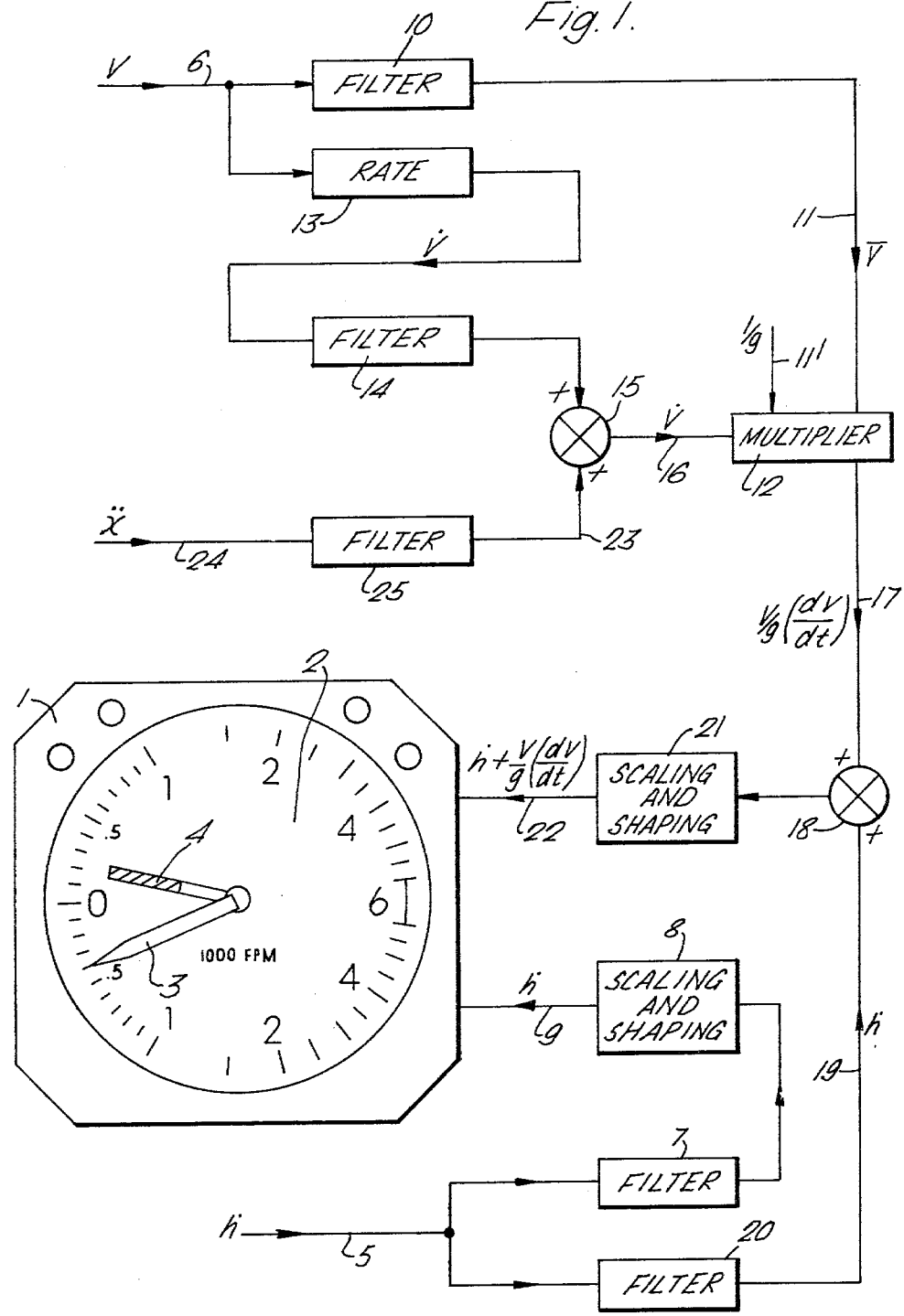

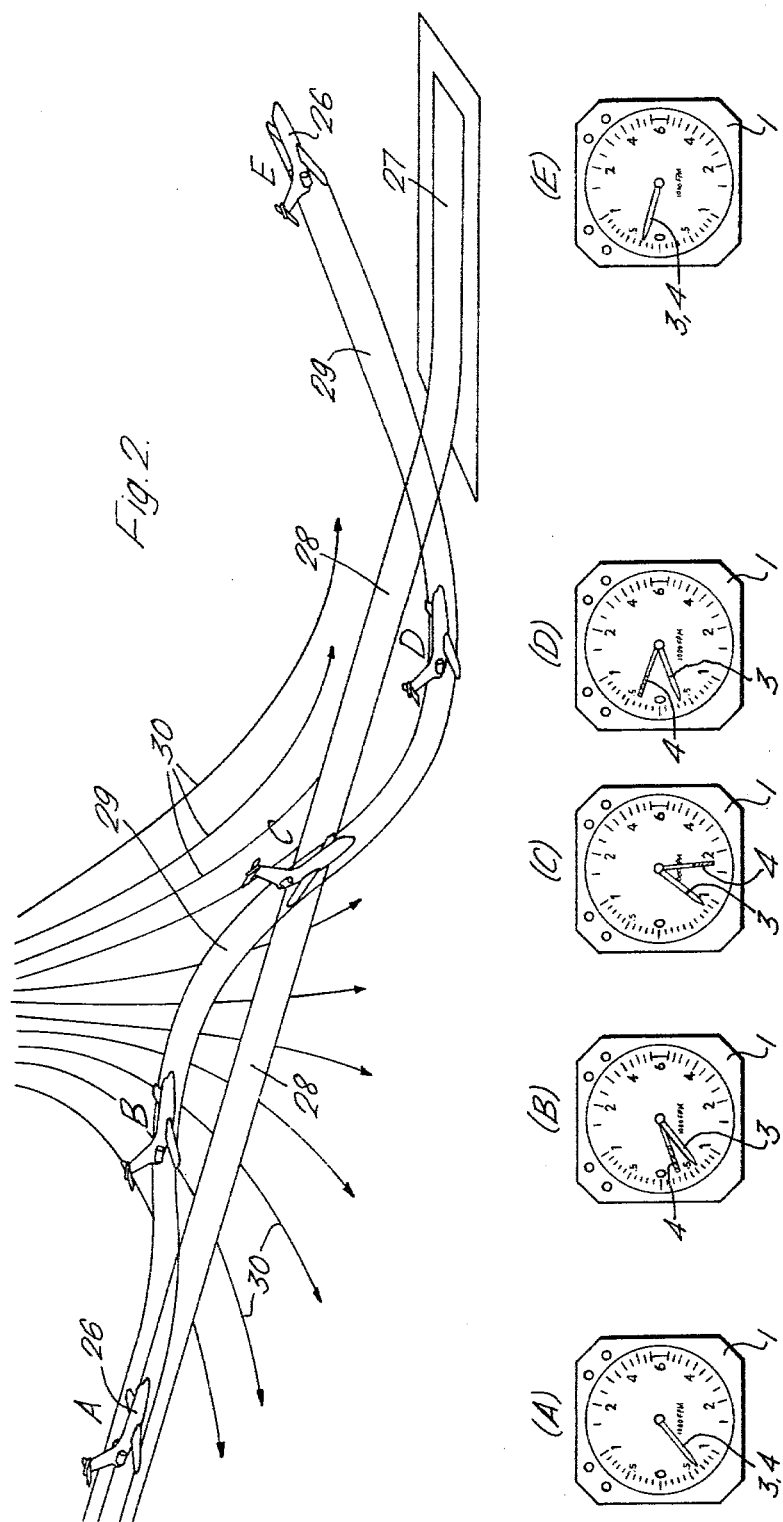

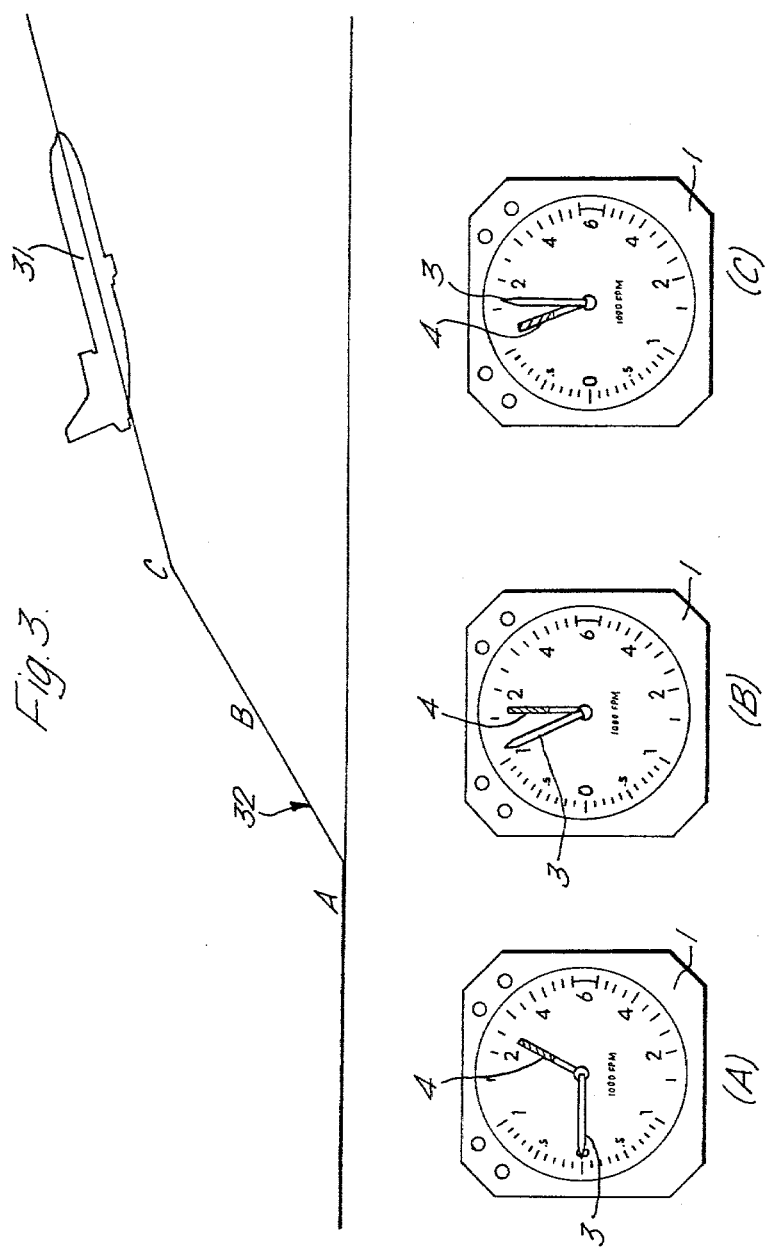

AIRCRAFT INSTRUMENT

A major hazard in the piloting of an aircraft is the condition known as "windshear," which may be described in general terms as an abrupt change in the direction and/or magnitude of the wind, and more precisely as an abrupt change in the three dimensional wind vector. Windshear can be caused by several different meteorological phenomenon, but perhaps the most common is thunderstorm activity. Vertical windshear can affect the height of an aircraft directly, whereas horizontal windshear can affect the height by causing the true air speed, and hence the lift, of the aircraft to change. These effects can be particularly dangerous during take-off or landing, and it is important that they should be recognised and, if necessary, countered by the pilot as soon as possible.

Consequently, it is highly desirable to provide the pilot of an aircraft with an early indication of the onset of windshear, but although proposals have been made to achieve this, no effective and acceptable indicator is at present available. One particular reason for this is an aversion to adding still further to the multitude and complexity of the instruments which have to be scanned by the pilot, together with the realisation that unless such an instrument forces itself on the pilot's attention it will be virtually useless.

It is generally agreed that the best practical way of detecting the onset of windshear is by monitoring the rate of change of total energy (i.e. potential energy plus kinetic energy) per unit mass of the aircraft. This may be expressed as:

$$\frac{d}{dt}(h + \tfrac{1}{2}\frac{V^2}{g})$$

where h is the height of the aircraft and V is the true air speed of the aircraft, and the rate of change of total energy per unit mass of an aircraft as just defined will be referred to hereinafter as the energy rate of the aircraft. The energy rate of an aircraft changes quickly with sudden changes in air speed or during down burst situations, and can therefore be used to give an immediate indication that windshear may be occurring.

The present invention aims to make use of the energy rate of an aircraft to provide the pilot with a warning of possible windshear without adding to the range of instruments which the pilot has to scan, and is based on the appreciation that the energy rate has the dimensions of a velocity and that it can therefore be compared with the vertical speed of the aircraft. Indeed, under stable flight conditions when the air speed is changing relatively slowly or not at all, the energy rate and the vertical speed of the aircraft are virtually identical.

According to the invention, therefore, the vertical speed indicator instrument of an aircraft is provided with a second, independent pointer in addition to the normal pointer which is arranged to indicate the vertical speed of the aircraft, the second pointer being arranged to move in response to changes in the energy rate of the aircraft and to indicate the energy rate as hereinbefore defined to the same scale as the vertical speed. In other words, the instrument in accordance with the invention comprises a conventional vertical speed indicator instrument provided with an extra pointer which is arranged to indicate the energy rate of the aircraft.

In the normal form of vertical speed indicator, the vertical speed pointer is a pivoted needle which is mounted to turn about an axis at the centre of a dial which carries the vertical speed scale, and in this case the energy rate pointer is preferably a second needle which is pivoted to turn about the same axis as the vertical speed needle. Under stable flight conditions the two needles will be together, the energy rate needle preferably being hidden behind the vertical speed needle so that the instrument then appears exactly the same as a normal vertical speed indicator. However, if there is a sudden change in the flight conditions, such as may be caused by windshear, the energy rate of the aircraft will change quickly and the energy rate needle will separate from the vertical speed needle, thus giving the pilot an immediate warning of a change in flight path and possible danger. The magnitude and direction of the separation of the energy rate needle from the vertical speed needle will indicate the nature and severity of the windshear, and the pilot will therefore be able to determine what corrective action, if any, is necessary in the circumstances. Various examples of instrument readings illustrating this in more detail will be described later.

The problems of where to display indications of windshear and what form any warning should take are thus solved by the present invention in a simple manner without increasing the number of instruments on the flight panel and without needing a warning light, although the instrument in accordance with the invention may, if desired, be provided with a light which is arranged to illuminate when excessive windshear is detected. Furthermore, since the vertical speed indicator is one of the six basic flight instruments which are within a pilot's normal scan, and since the instrument in accordance with the invention looks familiar and is arranged to indicate warnings of windshear in a simple and easily interpreted manner (often in a manner which indicates a condition which the pilot already knows is dangerous i.e. high rate of descent), it is thought that the instrument in accordance with the invention should readily be accepted by pilots in general.

Preferably the instrument comprises first control means which drives the vertical speed pointer in a conventional manner in response to an input signal representative of the vertical speed of the aircraft, and second control means which drives the energy rate pointer and which is responsive to the vertical speed input signal and to a second input signal representative of the true air speed of the aircraft. Preferably the first and second control means are arranged to be responsive to digital input signals so that the instrument can be used as a direct replacement for the conventional vertical speed indicator in an aircraft fitted with a digital air data computer, the vertical speed and true air speed inputs being obtained directly from the air data computer. For aircraft with an analog air data computer the instrument will be fitted with an analog to digital converter. For aircraft without an air data computer, the same instrument can still be used provided simple barometric rate and air speed transducers are installed.

Because the second pointer of the instrument in accordance with the invention actually monitors the energy rate of the aircraft, it will be appreciated that the energy rate pointer will reflect energy rate changes resulting not only from windshear but also from loss of performance for any other reason. In either case the pilot is warned earlier than he might otherwise have been and will take the necessary corrective action. Often this will involve opening the throttles to increase thrust, and although the energy rate pointer will indicate when stable flight conditions have been restored, i.e. when the vertical speed and energy rate pointers are realigned at the required vertical speed, the energy rate pointer will be slow to respond to the increase in thrust because the air speed and vertical speed signals from which the energy rate pointer is driven will invariably be damped to reduce noise interference. Preferably therefore, the instrument includes means which is responsive, in the short term, to a signal representative of the longitudinal acceleration of the aircraft (i.e. along the longitudinal axis of the aircraft) to improve the response time of the energy rate pointer to the start of acceleration. This signal may be obtained from a suitable accelerometer, which is preferably included as part of the instrument. With this arrangement the energy rate pointer will respond almost immediately to any change in the total energy of the aircraft, and will give the pilot an almost immediate indication of the effect of any throttle action without detracting from the normal function of the instrument. This can be very important in helping the pilot to decide whether or not to go around when correcting for an instance of windshear near the end of the glide path during a landing.

Furthermore, because the instrument monitors energy rate as well as vertical speed, it can also assist a pilot in flight situations other than when windshear or some other loss of performance occurs. For example, it can assist the pilot in monitoring take-off acceleration, in achieving a constant speed noise abatement climb, and in intercepting the glide path and maintaining the correct glide slope with minimum throttle activity and without requiring any glide slope signal.

An example of an instrument in accordance with the invention and some of its modes of use will now be described with reference to the accompanying drawings, in which:

FIG. 1 is a view of the dial of the instrument, together with a block diagram of its operating control unit;

FIG. 2 illustrates the possible flight path of an aircraft during a landing approach in which the aircraft encounters windshear due to thunderstorm activity, together with typical readings of the vertical speed indicator in accordance with the invention at different points along the flight path; and, FIG. 3 illustrates the flight path of an aircraft during take-off, together with typical readings of the vertical speed indicator instrument in accordance with the invention at different points along the flight path.

As shown in FIG. 1, the instrument 1 has a standard dial 2 graduated to show vertical speed, either up or down, in units of thousands of feet per minute. The normal vertical speed indicating needle is shown at 3 and the additional needle which is provided in accordance with the invention to indicate the energy rate of the aircraft is shown at 4. In the position illustrated in FIG. 1 there is an angular separation between the two needles 3 and 4 indicating that the aircraft is descending but has the potential to climb. Under stable flight conditions at constant speed however, the needles 3 and 4 will be together, the needle 3 covering the needle 4.

The instrument 1 has two inputs 5 and 6, the input 5 being designed to receive a digital signal $\dot{h}$ from the air data computer of an aircraft representing the true height rate or vertical speed of the aircraft, and the input 6 being designed to receive a digital signal V from the air data computer representing the true air speed of the aircraft.

The signal $\dot{h}$ received by the input 5 is damped by a filter 7 before being scaled and shaped by means 8 to suit the scale of the instrument 1 and to provide a drive signal $\dot{h}$ on a line 9. The vertical speed needle 3 is driven in response to the drive signal on line 9 in a conventional manner (not shown).

The signal V received by the input 6 is damped by a filter 10 and is supplied by a line 11 to a multiplier 12 which also receives a constant input signal representing 1/g, where g is the gravitational acceleration constant, on a line 11'. The signal V received by the input 6 is also supplied to a differentiator 13 to provide a signal $\dot{V}$, representing the rate of change of air speed, which is then damped by a filter 14 and supplied to the miltiplier 12 via an adder 15 and a line 16. The output from the multiplier 12 therefore represents V/g (dV/dt) and is carried by a line 17 to an adder 18. The adder 18 also receives an input signal on a line 19, which is derived via a filter 20 from the $\dot{h}$ signal received by the input 5. The output from the adder 18 therefore represents $\dot{h}+(V/g)$ (dV/dt) and is fed to scaling and shaping means 21 to provide a signal corresponding to $\dot{h}+(V/g)$ (dV/dt) on a line 22 for driving the needle 4. As will be appreciated, the drive signal on line 22 represents the rate of change of the total energy per unit mass of the aircraft as hereinbefore defined, and the needle 4 (which is driven in a conventional manner in response to the drive signal) indicates the energy rate on the dial 2 to the same scale as the vertical speed.

It will be noted that the adder 15 also receives an input from a line 23. This input is derived from an accelerometer (not shown) providing a signal $\ddot{x}$ which represents the longitudinal acceleration of the aircraft itself and which is supplied on a line 24 to a filter 25, and thence to the line 23. The filter 25 is matched to the filter 14 so that the output of the filter 25 ( over a relatively short period, e.g. 2 seconds) following receipt of the longitudinal acceleration signal $\ddot{x}$ is the washout of the output from the filter 14. This means that when the aircraft accelerates suddenly, such as when the throttles are opened to increase thrust, initially the resulting $\dot{V}$ signal on line 16 will be provided mainly by the signal supplied to the adder 15 on line 23 and derived from the accelerometer signal $\ddot{x}$, since the corresponding air-based $\dot{V}$ signal provided by the differentiator 13 will be slow to build because of the effect of the filter 14. Consequently the energy rate needle 4 will register the increase in thrust almost immediately. Shortly however, as the $\dot{V}$ signal supplied to the adder 15 from the differentiator 13 and the filter 14 increases, the input to the adder 15 from line 23 will fade as the accelerometer derived signal is washed out, and the output signal on line 16 reverts to a true air based $\dot{V}$ signal. As will be appreciated, the provision of the accelerometer input $\ddot{x}$ on line 24 will not hinder the normal operation of the instrument 1, and will not affect the detection and indication of windshear since this condition will only affect one or other, or both, of the $\dot{h}$ and V signals received by the inputs 5 and 6 respectively.

It will also be noted that the $\dot{h}$ signal received by the input 5 is fed through separate filters 7 and 20 in order to derive the $\dot{h}$ components of the drive signals on lines 9 and 22. These filters are of conventional form which will multiply the $\dot{h}$ signal by a term (1/1+Ts), where s is the Laplace operator and T is the time constant of the filter, and will thereby introduce a delay on the ḣ signal transmitted. Thus, by using different filters 7 and 20 the ḣ components of the two drive signals can be delayed by slightly different amounts to suit the instrument. In this case the ḣ signal from the filter 20 is delayed longer than that from the filter 7 to match this potential energy rate signal to the kinetic energy rate signal supplied to the adder 18. This will avoid fluctuations of the energy rate needle 4 due to changes in the attitude of the aircraft.

FIG. 2 illustrates how the instrument will function to indicate windshear during a landing approach. In the drawing the intended glide path for an aircraft 26 on final approach to a landing strip 27 is shown by 28, and the actual flight path of the aircraft is shown by 29, the flight path deviating from the glide path as a result of a down burst indicated by the arrows 30. Typical readings of the vertical speed indicator instrument 1 of the aircraft 26 at the different points A to E along the flight path 29 are shown at the bottom of the drawing.

At point A the aircraft 26 has just commenced final approach at the outer marker beacon and is on a speed established descent following the glide path 28. At this point the instrument 1 shows the needles 3 and 4 together and indicating a stable descent of about 650 feet per minute, and if the flight conditions were to remain stable this reading would be maintained until the flare.

At point B the aircraft encounters windshear conditions caused by a sudden increase in headwind. On the instrument 1 this is indicated by the energy rate needle 4 moving above the vertical speed needle 3, representing an increase in the energy rate to be followed by an increase in height rate. Increasing head winds are not immediately dangerous but can lead to handling problems in dissipating the new found energy. In this case the pilot action is to use the control stick and to throttle back in order to realign the two needles at the glide path descent rate.

At the point C the aircraft encounters severe windshear conditions caused by downdraft and decreasing head winds. On the instrument 1 this is indicated by the energy rate needle 4 moving sharply downwards away from the vertical speed needle 3 which also drops, representing a rapid decrease in the energy rate and also a decrease in the height rate. This is a very dangerous situation and the pilot must quickly increase power and use the stick to try to realign the needles and restore the stable approach. If it appears that this cannot be done in time, the decision to go around is taken by pitching up and applying full power. This is in fact what is happening at point D where the instrument 1 shows a rise in the vertical speed needle 3 and the energy rate needle 4 well above the needle 3, indicating a large increase in the energy rate and that the rate of descent is being rapidly reduced. At point E the aircraft 26 has achieved a steady climb, and this is indicated by the instrument 1 which shows the needles 3 and 4 aligned at a rate of ascent of 250 feet per minute.

FIG. 3 illustrates the operation of the instrument 1 during a typical take-off of an aircraft 31. In the drawing the take-off roll and climb path of the aircraft 31 is shown at 32, and typical readings of the vertical speed indicator instrument 1 at the points A, B, and C along the path 32 are shown at the bottom of the drawing.

During the take-off roll of the aircraft, i.e. its acceleration along the runway, there is of course a change in the energy rate of the aircraft without any change in vertical speed. This is shown by the instrument 1 at point A where the energy rate needle 4 indicates a large positive energy rate while the vertical speed needle 3 remains at zero.

After lift-off the needle 3 rises rapidly, although, as indicated by the instrument 1 at point B, the energy rate needle 4 will remain above the needle 3 while the aircraft 31 is still accelerating in the climb. When the desired speed is obtained the two needles 3 and 4 are aligned by throttling back or slightly increasing the climb rate in order to achieve a speed stabilised climb.

At point C the pilot has just throttled back for noise abatement purposes, and as shown by the instrument 1 the energy rate needle 4 has accordingly dropped below the needle 3. The pilot then needs to restabilise the flight by pushing forward on the stick to reduce the rate of climb until the two needles 3 and 4 are realigned.

If during the climb windshear occurs as a result of decreasing head wind, the energy rate as indicated by the needle 4 decreases and separates from the vertical speed needle 3. In a severe case, the needle 4 may go negative, followed later by the needle 3 if no corrective action is taken. In the case of downward vertical windshear, both of the needles 3 and 4 will fall, and in either case the pilot will need to increase thrust and adjust the stick to correct the situation.

We claim:

1. In a vertical speed indicator instrument for an aircraft, said instrument comprising a graduated dial, a first pointer, and first control means for controlling said first pointer to indicate the vertical speed of the aircraft on said dial, said first control means including height rate responsive means responsive to a first input signal representative of the rate of change of height of the aircraft, the improvement wherein said instrument also comprises a second pointer movable independently of said first pointer, said second control means including said height rate responsive means and airspeed responsive means responsive to a second input signal representative of the true airspeed of said aircraft, said second control means controlling said second pointer and causing said second pointer to move in response to changes in the rate of change of the total energy of the aircraft as defined by the formula $$\frac{d}{dt}(h + \tfrac{1}{2}\frac{V^2}{g})$$

where h is the height and V is the true airspeed of the aircraft, said second pointer indicating the energy rate of change on said dial to the same scale as said vertical speed whereby said first and second pointers will track together under steady flight conditions but will separate from each other in response to sudden changes in the airspeed of said aircraft.

2. An instrument as defined in claim 1 wherein said first and second pointers are formed by pivoted needles which are mounted to turn independently about a common axis at the center of said dial.

3. An instrument as defined in claim 1, wherein said height rate responsive means and said airspeed responsive means are responsive to digital input signals.

4. An instrument as defined in claim 1, wherein said airspeed responsive means includes differentiating means for deriving from said second input signal a derivative signal representative of the rate of change of the airspeed, means for multiplying together said second input signal and said derivative signal, and means for adding the multiplied signal to said first input signal.

5. An instrument as defined in claim 4, wherein said airspeed responsive means includes first and second filters for damping said second input signal and said derivative signal respectively before said second input signal and said derivative signal are multiplied by said multiplying means.

6. An instrument as defined in claim 5, wherein said height rate responsive means includes third and fourth filters for separately damping said first input signal so that signal so that said height rate signal used by said second control means is delayed by a different amount from said height rate signal used by said first control means and matches said multiplied signal to which said first input signal is added by said adding means.

7. An instrument as defined in claim 5, wherein said second control means includes means for modifying said derivative signal in response to a signal representative of the longitudinal acceleration of the aircraft to improve the response time of said second pointer to sudden accelerations, said modifying means comprising a filter which receives said longitudinal acceleration signal and which is the wash-out of said second filter for damping said derivative signal, and means for adding said filtered derivative signal.

8. An instrument as defined in claim 7, wherein said instrument includes an accelerometer for providing said longitudinal acceleration signal.

9. An instrument as defined in claim 4, wherein said second control means includes means for modifying said derivative signal in response to a signal representative of the longitudinal acceleration of said aircraft to improve the response time of said second pointer to sudden accelerations.

10. An instrument as defined in claim 1, wherein said second control means includes acceleration responsive means which is responsive, in the short term, to a signal representative of the longitudinal acceleration of said aircraft to improve the response time of said second pointer to sudden accelerations.

11. An instrument as defined in claim 1, wherein said height rate responsive means and said airspeed responsive means include filter means for damping said first and second input signals, and said second control means also includes acceleration responsive means which is responsive, in the short term to a signal representative of the longitudinal acceleration of the aircraft to compensate for delays caused by said filter means and thereby improve the response time of said second pointer to sudden accelerations.

* * * * *